(12) United States Patent
Henderson et al.

(10) Patent No.: US 9,573,258 B2
(45) Date of Patent: Feb. 21, 2017

(54) PULLING HEAD WORK STATION

(71) Applicant: Cerro Wire LLC, Hartselle, AL (US)

(72) Inventors: Douglas P. Henderson, Hartselle, AL (US); Joshua K. Young, Cullman, AL (US); Jeffery D. Kennedy, Joppa, AL (US)

(73) Assignee: CERRO WIRE LLC, Hartselle, AL (US)

( * ) Notice: Subject to any disclaimer, the term of this patent is extended or adjusted under 35 U.S.C. 154(b) by 0 days.

(21) Appl. No.: 14/613,823

(22) Filed: Feb. 4, 2015

(65) Prior Publication Data

US 2015/0151417 A1     Jun. 4, 2015

Related U.S. Application Data

(62) Division of application No. 14/057,275, filed on Oct. 18, 2013, now Pat. No. 8,973,235.

(60) Provisional application No. 61/716,203, filed on Oct. 19, 2012.

(51) Int. Cl.
| | |
|---|---|
| *B23P 19/00* | (2006.01) |
| *H05K 13/04* | (2006.01) |
| *B25B 27/02* | (2006.01) |
| *B23P 19/04* | (2006.01) |
| *H02G 1/08* | (2006.01) |
| *G02B 6/44* | (2006.01) |

(52) U.S. Cl.
CPC ............... *B25B 27/02* (2013.01); *B23P 19/04* (2013.01); *H02G 1/085* (2013.01); *G02B 6/4465* (2013.01); *Y10T 29/49002* (2015.01); *Y10T 29/514* (2015.01); *Y10T 29/5313* (2015.01); *Y10T 29/53235* (2015.01); *Y10T 29/53261* (2015.01); *Y10T 29/53265* (2015.01); *Y10T 29/53961* (2015.01); *Y10T 29/53991* (2015.01)

(58) Field of Classification Search
CPC .......... H02G 1/081; B23P 19/04; B25B 25/00; B25B 5/14; B29C 63/346; G02B 6/4465; H01R 43/048; Y10T 29/5313; Y10T 29/53235; Y10T 29/53261; Y10T 29/53265; Y10T 29/53991; Y10T 29/49174; Y10T 29/4999
USPC ... 29/729, 281.1, 428, 592.1, 745, 749, 755, 29/759.871
See application file for complete search history.

(56) References Cited

U.S. PATENT DOCUMENTS

| | | | |
|---|---|---|---|
| 3,810,289 A | 5/1974 | Hannabery | |
| 4,101,114 A | 7/1978 | Martin et al. | |
| 4,852,249 A * | 8/1989 | Muskulus | H01R 43/28 140/102 |
| 5,127,159 A | 7/1992 | Kudo et al. | |
| 5,606,795 A | 3/1997 | Ohba et al. | |
| 5,975,939 A | 11/1999 | Market | |
| 7,128,306 B2 | 10/2006 | Ames et al. | |
| 7,478,794 B1 | 1/2009 | Gohlke et al. | |

(Continued)

*Primary Examiner* — Thiem Phan
(74) *Attorney, Agent, or Firm* — Levenfeld Pearlstein, LLC

(57) ABSTRACT

A pulling head work station for attaching the lugs of pulling heads to cables, so that the cables may be pulled simultaneously through a conduit. The pulling head work station includes staggered cable receiving jigs, each jig having two clamps to hold a corresponding cable in place during attachment of a pulling lug. A chop saw to cut the cables and a crimper to secure a pulling lug to each stripped end portion of a cable may be slidably mounted to a work surface of the work station. A wire stripper may be removably attached to the work station.

6 Claims, 13 Drawing Sheets

(56) References Cited

U.S. PATENT DOCUMENTS 8,066,525 B2 11/2011 Melni
2010/0236045 A1 9/2010 Galindo et al.

\* cited by examiner

PULLING HEAD WORK STATION

CLAIM OF PRIORITY

This application is a Divisional Application of U.S. Non-Provisional application Ser. No. 14/057,275, filed Oct. 18, 2013, which claims priority to U.S. Provisional Patent Application No. 61/716,203, filed Oct. 19, 2012, the contents of which are hereby incorporated by reference.

FIELD OF THE INVENTION

The present technology relates to work stations for use in applying pulling heads to the ends of wires that have been wound onto a single reel for installation into a conduit.

DESCRIPTION OF RELATED ART

Pulling heads have been developed that allow multiple cables, sometimes referred to as wires or conductors, to be simultaneously pulled through a conduit. Such pulling heads include a plurality of lugs attached to lanyards of varying lengths, and the lanyards all attach to a single pulling head. A pulling rope running through the conduit is attached to a pulling head, which is in turn attached to each cable by separate pulling lugs, and the rope is pulled through the conduit, drawing the multiple conductor cabling from spools or other delivery mechanism and through the conduit.

BRIEF DESCRIPTION OF THE DRAWINGS

Specific examples have been chosen for purposes of illustration and description, and are shown in the accompanying drawings, forming a part of the specification. The drawings are not drawn to scale. Accordingly, the dimensions or proportions of particular elements, or the relationships between those different elements, as shown in the drawings are chosen only for convenience of description, but do not limit possible implementations of this disclosure. Like numerals represent like elements throughout the several figures.

DETAILED DESCRIPTION

Figure 1:
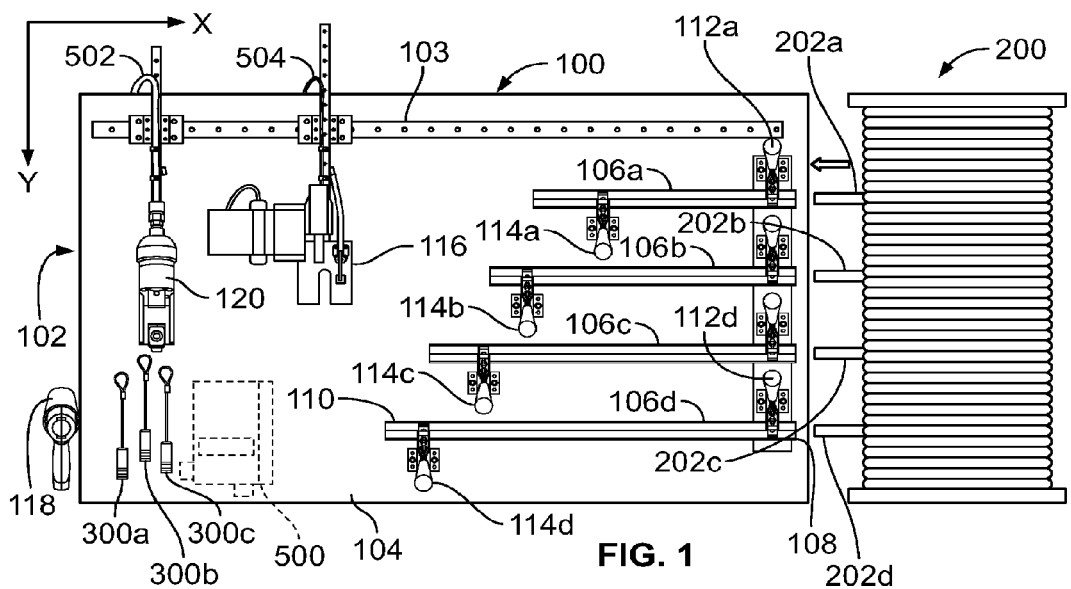
FIG. 1 is a top plan view of an embodiment a pulling head work station of the present technology.

FIG. 1 illustrates an embodiment of a pulling head work station 100 of the present invention. The pulling head work station 100 includes a base 102 having a work surface 104. The work surface 104 is preferably horizontal and level. The additional components of the pulling head work station 100 are mounted on the base 102 of the pulling head work station 100. The pulling head work station 100 can include a plurality of cable receiving jigs 106a-106d mounted to the work surface 104 of the base 102. Each cable receiving jig can have a first end 108 and a second end 110. A first cable clamp 112a-112d can be mounted at the first end 108 of each cable receiving jig 106a-106d, and a second cable clamp 114a-114d can be mounted at the second end 110 of each cable receiving jig 106a-106d.

As illustrated in FIG. 1, the length of cable receiving jig 106a is less than the length of cable receiving jig 106b. The length of cable receiving jig 106b is less than the length of cable receiving jig 106c. The length of cable receiving jig 106c is less than cable receiving jig 106d. As a result, while jig first ends 108 are in horizontal alignment, the jig second ends 110 are staggered (i.e. not in horizontal alignment with one another). As explained below, this permits the cables to be automatically and conveniently cut in a staggered fashion after they are clamped in the jigs 106a-106d.

It should be noted that while four jigs are illustrated in the figures and described below, the work station could feature an alternative number of jigs and associated components.

In methods of the present technology, a reel 200 including at least one cable 202a can be provided, and the pulling head work station 100 can be used to attach a pulling lug 300a-300c to each cable 202a-202d. To that end, the pulling head work station 100 can include a number of tools that can be used to cut cables 202a-202d, strip the end portions 204 of the cables 202a-202d, and secure pulling lugs 300a-300c to the stripped end portions 204 of the cables 202a-202d. For example, the pulling head work station 100 can include a chop saw 116 slidably mounted to the base 102 via track 103, a stripper 118 removably mounted to the base 102, and a crimping head 120 slidably mounted to the base, also by track 103. The track 103 is mounted to the work surface 104 of the base 102.

The pulling head work station 100 can also include a power supply system 500 that supplies power to at least one of the chop saw 116 (via line 504), the stripper 118 and/or the crimping head 120 (via line 502). In one example, the power supply system 500 can include a self contained power source, such as a battery, that provides power to the work station tools. In another example, power supply system 500 can include a power cord that can connect to an electrical outlet to transfer power to the power supply system 500. In a third example, a power supply system 500 could include both a self-contained power source and at least one power cord, to ensure that power can be provided to the power supply system 500 under various circumstances.

Figure 2:
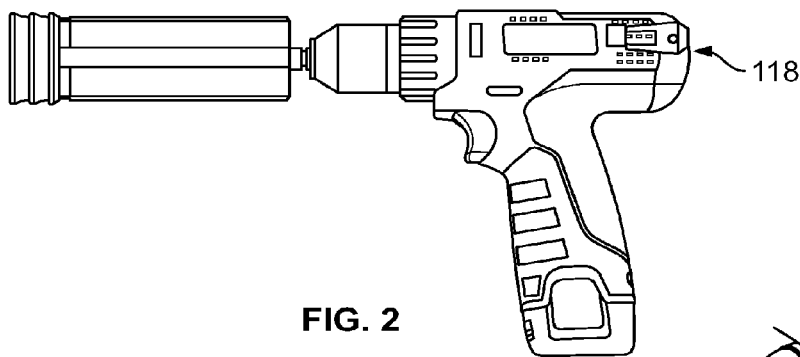
FIG. 2 is a side elevational view of a stripper that can be used with a pulling head work station of FIG. 1.

FIG. 2 illustrates one example of a stripper 118 that can be used with a pulling head work station 100. The stripper 118 can be a portable device, and can be removably mounted to the base 102 of the pulling head work station 100. The stripper can be a cordless device, which can be electrically connected to the power supply system 500 to be recharged when it is mounted to the base 102 of the pulling head work station 100. Alternatively, the stripper 118 can include a power cord that is connected to the power supply system 500.

Figure 3:
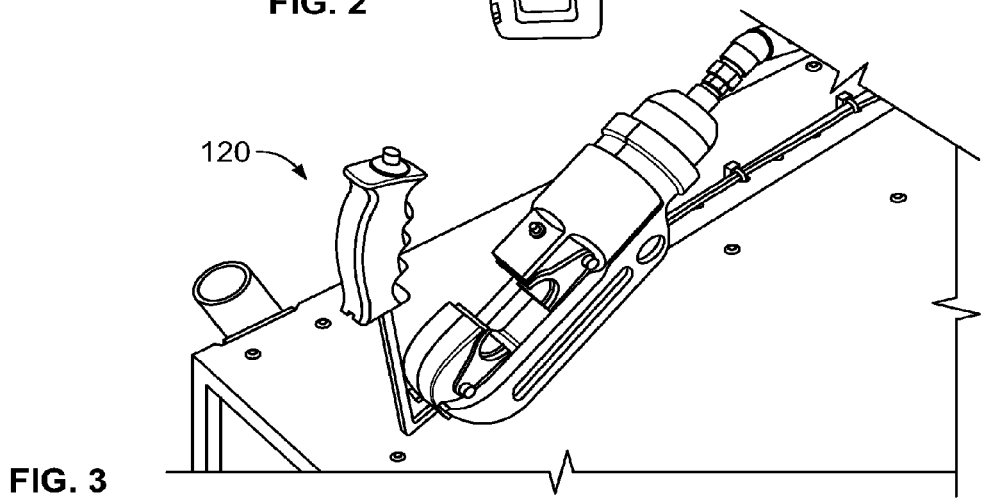
FIG. 3 is a perspective view of a crimping head that can be used with a pulling head work station of FIG. 1.
Figure 4:
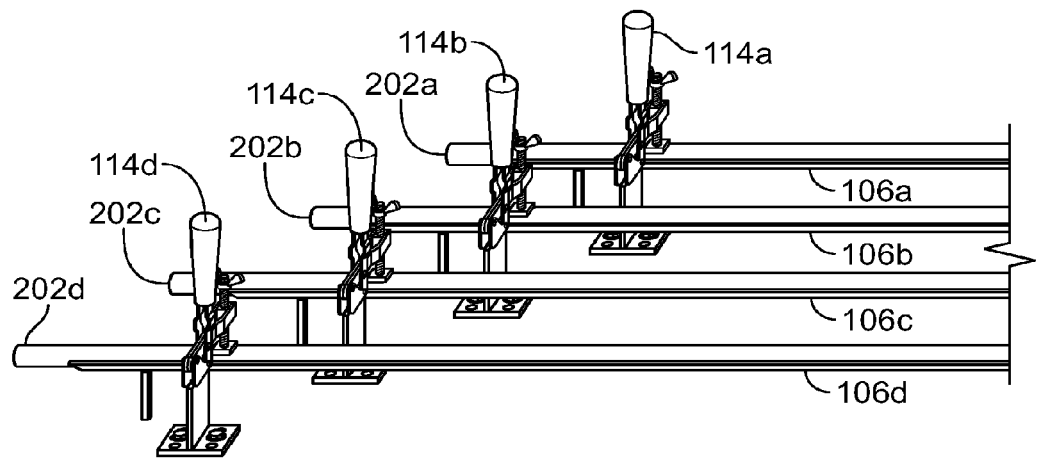
FIG. 4 is a perspective view of a plurality of cables placed into cable receiving jigs of the pulling head work station of FIG. 1.

FIG. 3 illustrates one example of a crimping head 120 that can be used with a pulling head work station 100. The crimping head 120 can be slidably mounted to the base 102 of the work station 100 via track 103 and a carriage. As will be explained in greater detail below, in the illustrated embodiment, the crimping head 120 is slidable in two directions with respect to the work surface 104, such as lengthwise and across within the plane defined by the X and Y arrows of FIG. 1. The crimping head 120 is also illustrated as being mounted to the base 102 of the work station in parallel with the chop saw 116.

Figure 5:
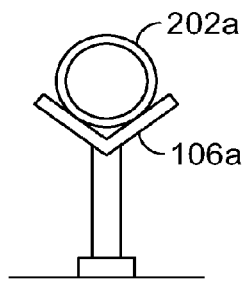
FIG. 5 is an end elevational view of a cable receiving jig of the pulling head work station of FIG. 1.
Figure 6:
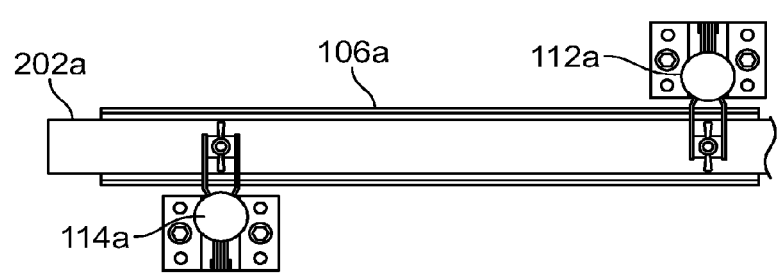
FIG. 6 is a top plan view of a portion of a cable receiving jig of the pulling head work station of FIG. 1.
Figure 7:
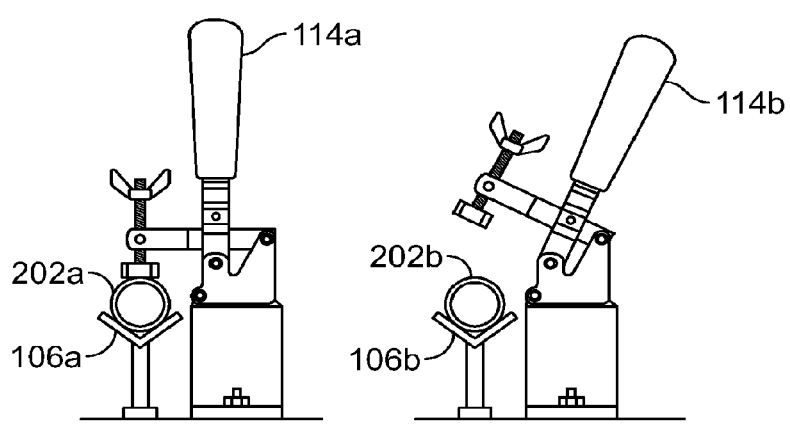
FIG. 7 is an end elevational view of cable receiving jigs of the pulling head work station of FIG. 1, in an open position and in a clamped position.

FIGS. 4-7 illustrate a plurality of cables 202a-202d placed into cable receiving jigs 106a-106d of the pulling head work station 100 and clamped with first clamps 112a-112d (FIG. 1) and second clamps 114a-114d. As illustrated, the cable receiving jigs 106a-106d can be mounted parallel to each other with the ends 110 featuring a staggered configuration due to the differing lengths of jigs 106a-106d. Additionally, as shown in FIGS. 5 and 7, each cable receiving jig 106 can have a V-shaped cross section.

FIG. 7 illustrates second clamps 114a and 114b in a clamped position and in an open position, respectively. Each of the first clamps 112a-112d and second clamps 114a-114d has an open position and a clamped position, and can function in the same manner illustrated in FIG. 7.

A method of using a pulling head work station 100 of the present technology can include placing a portion of each cable 202a-202d onto a corresponding cable receiving jig 106a-106d mounted to the work surface 104 of a pulling head work station 100. As discussed above, each cable receiving jig 106a-106d can have a first end 108 and a second end 110. The method can also include clamping the placed portion of each cable 202 with a first cable clamp 112 mounted at the first end 108 of each cable receiving jig 106 and a second cable clamp 114 mounted at the second end 114 of each cable receiving jig 106.

After the cables 202a-202d are clamped into their corresponding jigs 106a-106d, the method can include cutting each cable 202a-202d to a desired length using a chop saw 116 slidably mounted to the pulling head work station 100 to produce a cut cable.

The method can then include removing at least one cable layer, such as the cable jacket and/or insulation, from an end portion 204 of each cut cable with a stripper 118 removably mounted to the pulling head work station 100.

Once the end portion 204 of the cable is stripped, a pulling lug 300 can be placed onto each stripped end portion 204. The method can then include crimping a pulling lug 300 onto each end portion 204 using a crimping head 120 slidably mounted to the base 102. Once the pulling lugs have been secured to the cables 202 by crimping, the method can include unclamping each cable 202 from each cable receiving jig 106.

Figure 8:
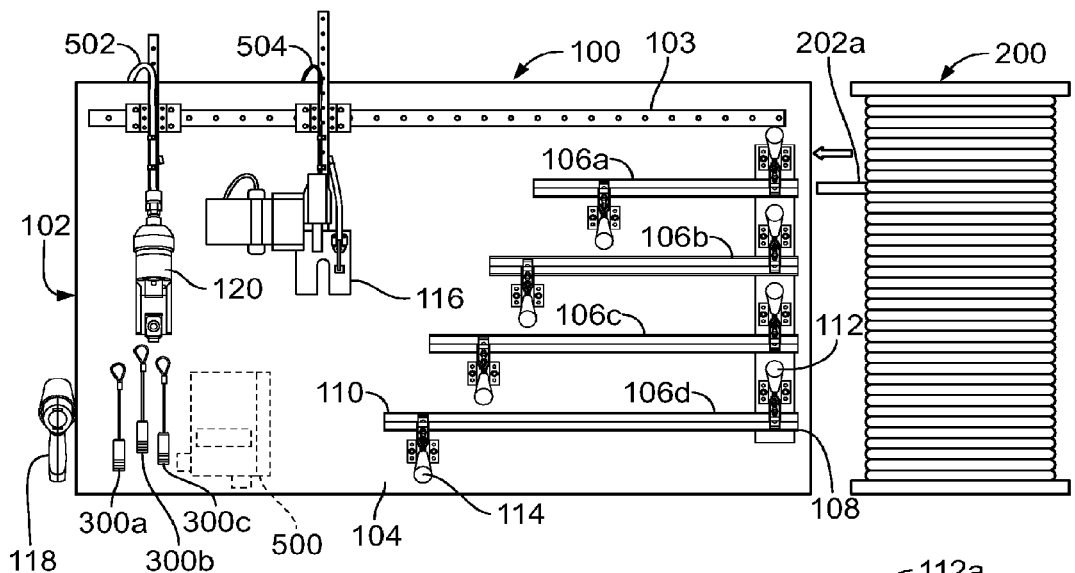
FIG. 8 is a top plan view of a single cable being fed to the pulling head work station of FIG. 1.
Figure 9A:
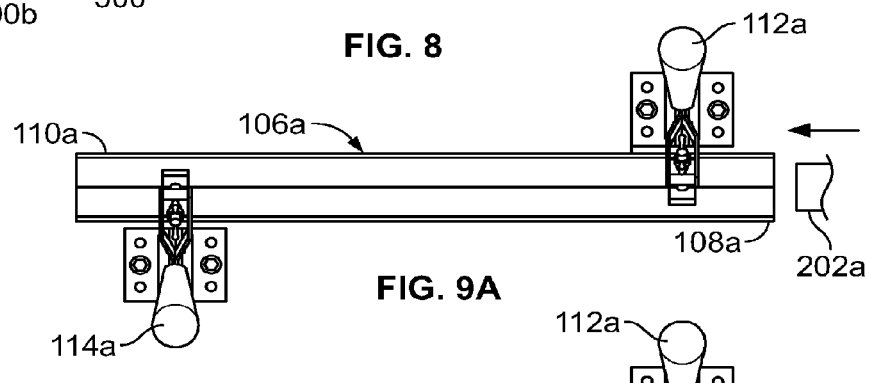
FIGS. 9A-9C are top plan views illustrating one of the cables of FIG. 8 being fed into a cable receiving jig of the pulling head work station of FIG. 1.
Figure 9B:
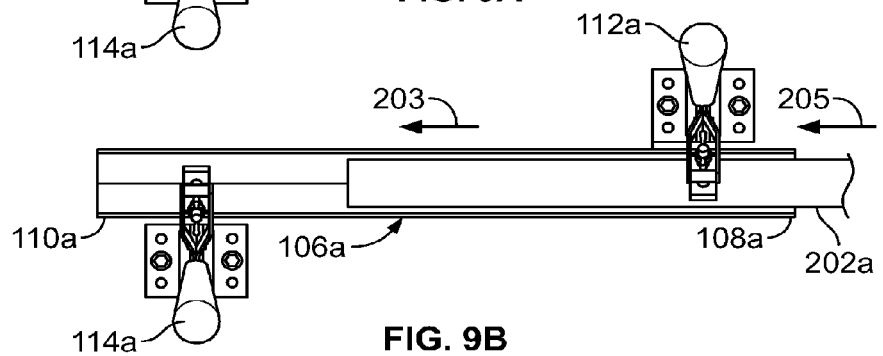
Figure 9C:
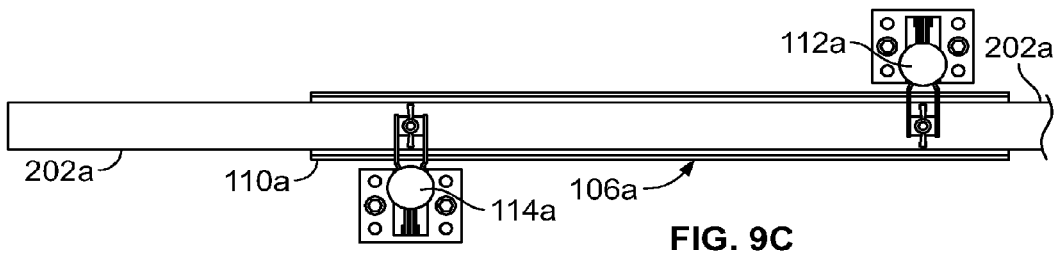

FIGS. 8 and 9 illustrate placing a portion of each cable from roll 200 onto a cable receiving jig 106a-106d, and clamping the placed portion of each cable with a first cable clamp 112 mounted at the first end 108 of each cable receiving jig 106a-106d and a second cable clamp 114 mounted at the second end 110 of each cable receiving jig. Specifically, as shown in FIGS. 9A-9C, a cable 202a can be fed into a cable receiving jig 106a of a pulling head work station 100, in the direction of the arrows 203 and 205 of FIG. 9B as illustrated, and then clamped by clamping each of the first clamp 112a and second clamp 114a.

Figure 10:
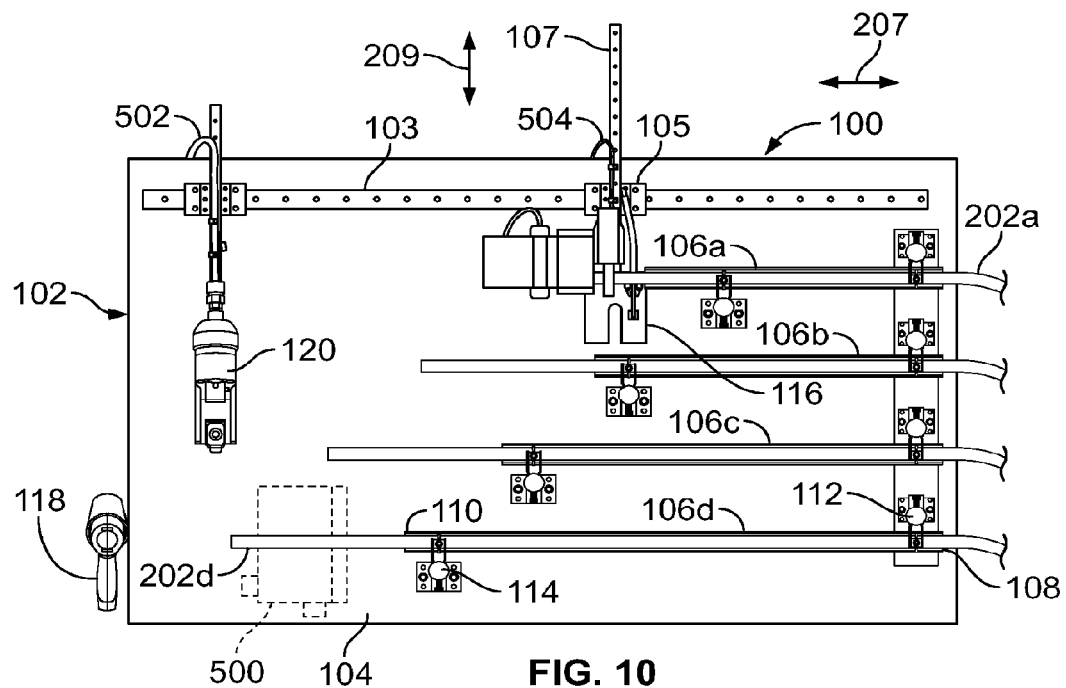
FIG. 10 is a top plan view of the pulling head work station of FIG. 1, with the chop saw in a first position.
Figure 11:
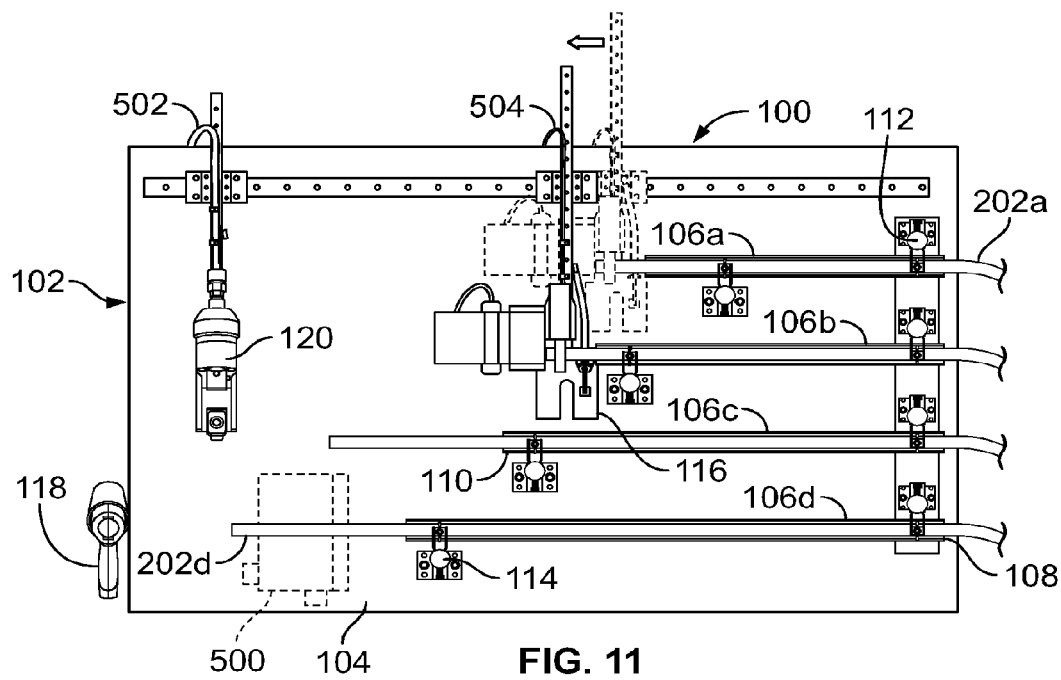
FIG. 11 is a top plan view of the pulling head work station of FIG. 1, with the chop saw in a second position.
Figure 12:
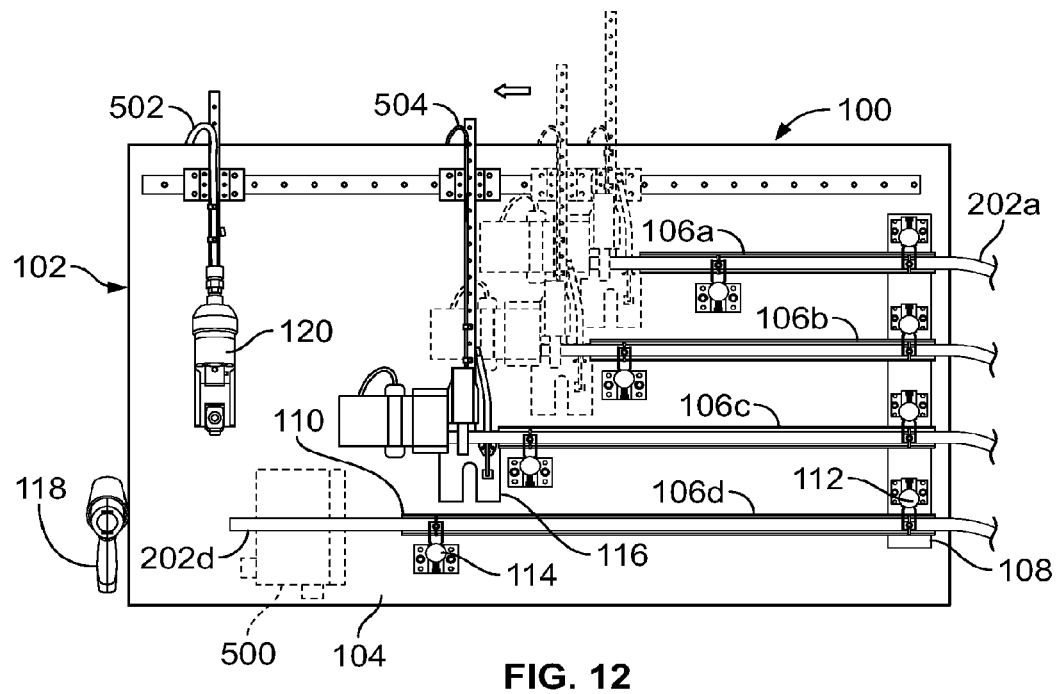
FIG. 12 is a top plan view of the pulling head work station of FIG. 1, with the chop saw in a third position.
Figure 13:
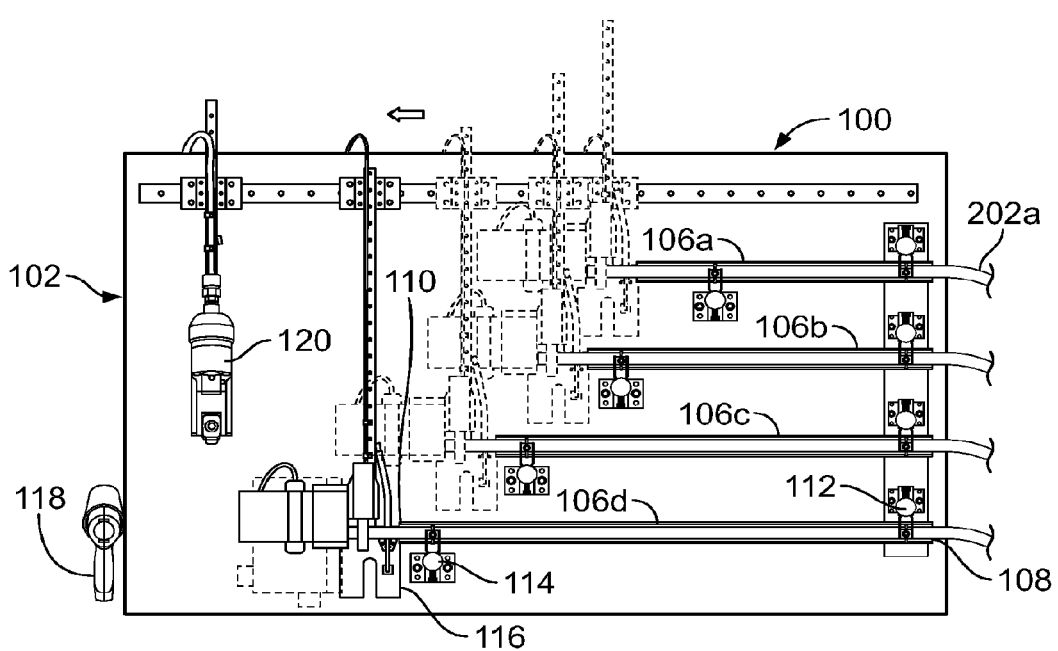
FIG. 13 is a top plan view of the pulling head work station of FIG. 1, with the chop saw in a fourth position.
Figure 14:
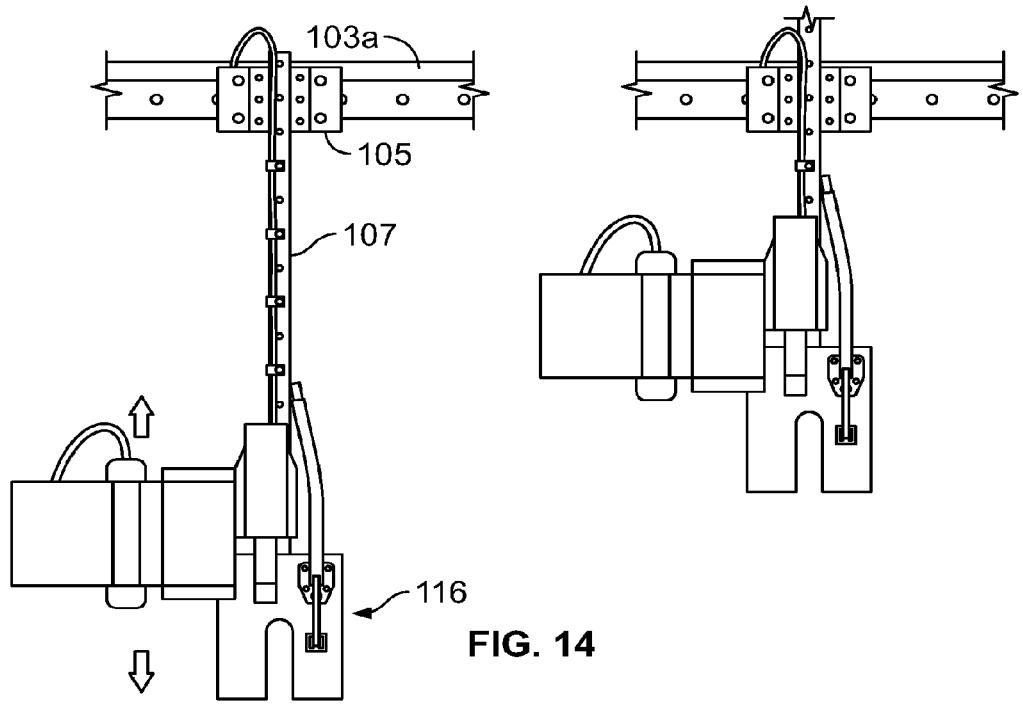
FIG. 14 is a top plan view of an embodiment of a chop saw that can be used with the pulling head work station of FIG. 1 illustrating alternative positions.
Figure 15:
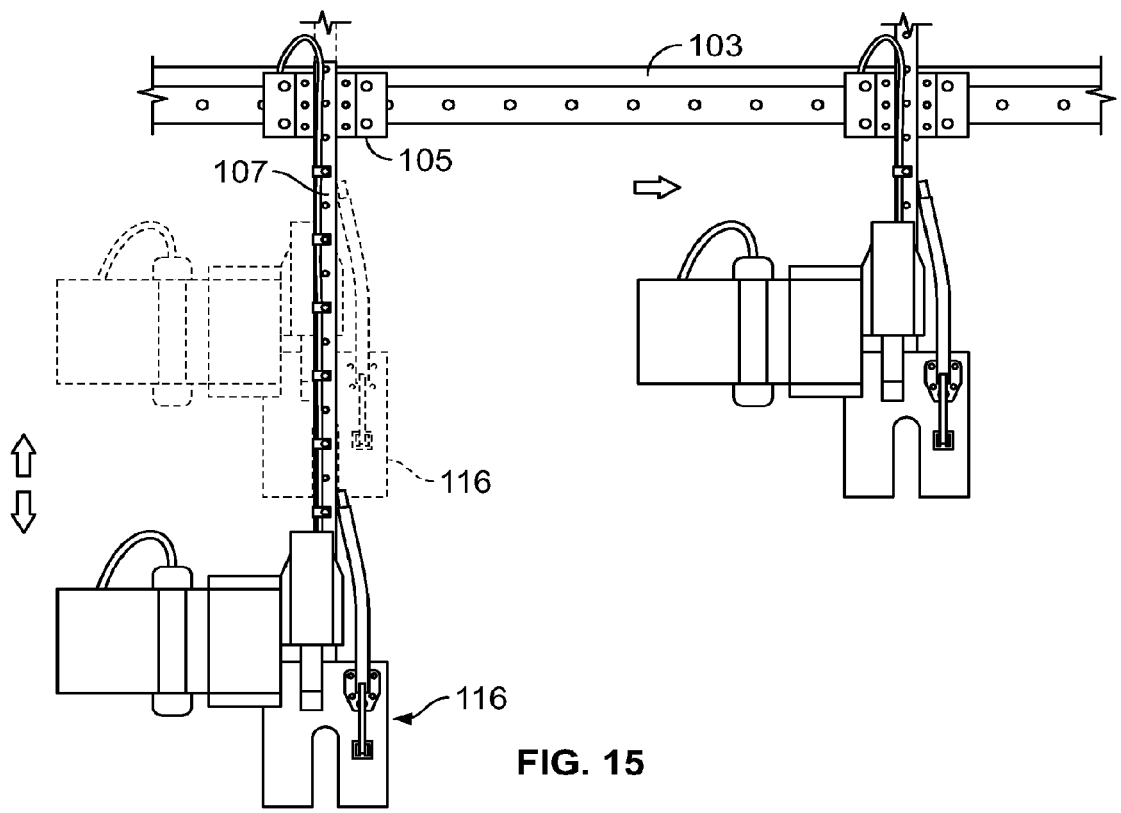
FIG. 15 is a top plan view of the chop saw of FIG. 14 illustrating movement between the alternative positions of FIG. 14.

FIGS. 10-16 illustrate one example of use of the chop saw 116 to cut, in serial, each cable 202a-202d to a desired length. As illustrated in FIG. 10, the chop saw 116 can be positioned with respect to a first cable 202a via a track 103 and a carriage 105 to cut the cable. The carriage 105 of FIG. 10 slides along the track 103 in the direction of arrows 207. Furthermore, the chop saw 116 is mounted at one end of slide bar 107. Slide bar 107 slides with respect to the carriage 105 in the directions indicated by arrows 209 of FIG. 10.

As a result, as illustrated in FIGS. 11-15, the chop saw 116 can be repositioned with respect to a second cable 202b, a third cable 202c, and a fourth cable 202d by sliding it incrementally in a lengthwise and a crosswise direction with respect to the work surface 104 of the pulling head work station 100 via track 103, carriage 105 and slide bar 107. As noted previously, the cables are automatically and conveniently cut to the desired lengths in a staggered fashion due to the staggered configuration of the ends 110 of the jigs 106a-106d.

Figure 16:
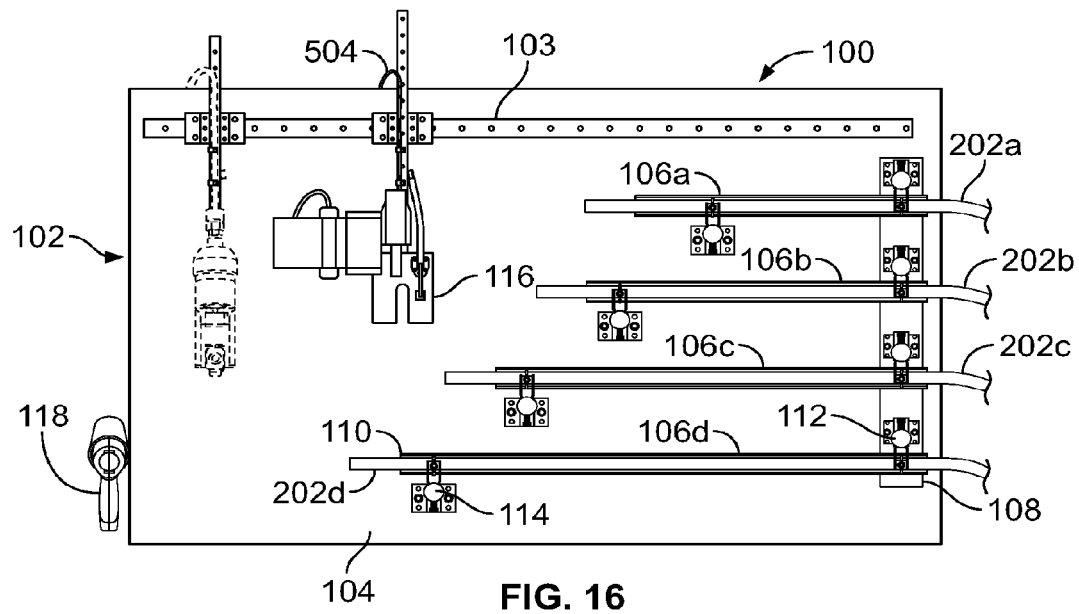
FIG. 16 is a top plan view of the pulling head work station of FIG. 1, with the chop saw in a rest position.

As illustrated in FIG. 16, once each cable 202a-202d has been cut to a desired length, the chop saw 116 can be returned to a rest position.

Figure 17:
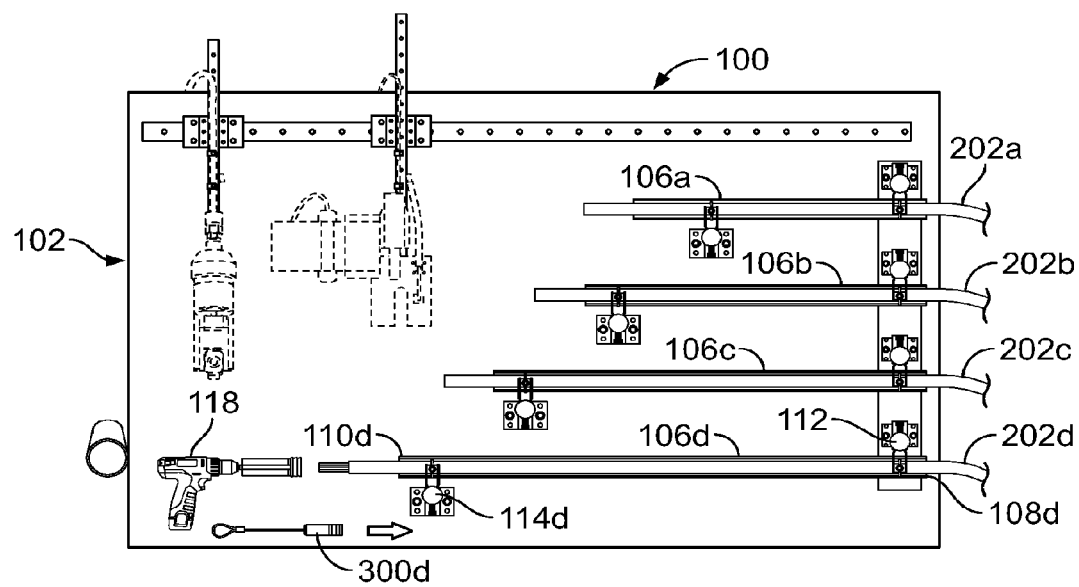
FIG. 17 is a top plan view of the pulling head work station of FIG. 1, with the stripper of FIG. 2 in use.
Figure 18A:
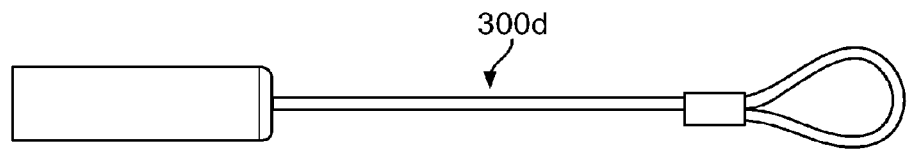
FIGS. 18A-18C are side elevational views of a pulling lug that can be used with the present technology being placed onto the stripped end portion of a cable.
Figure 18B:
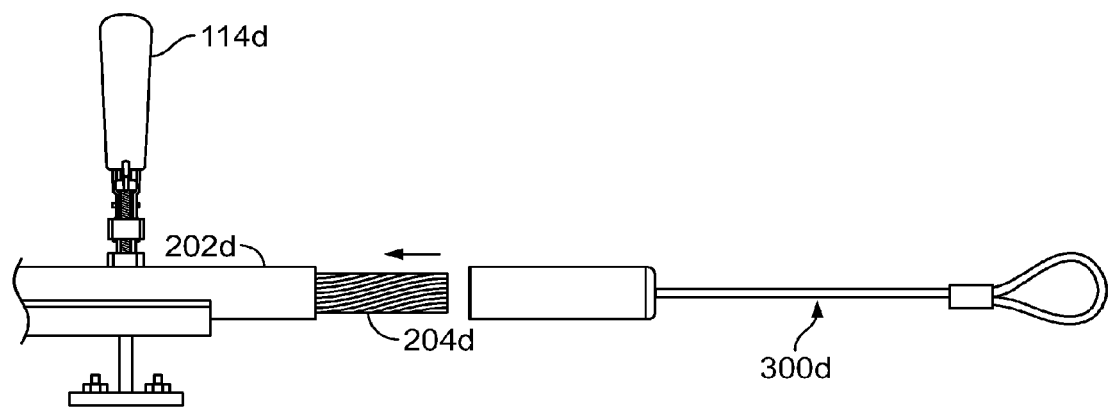
Figure 18C:
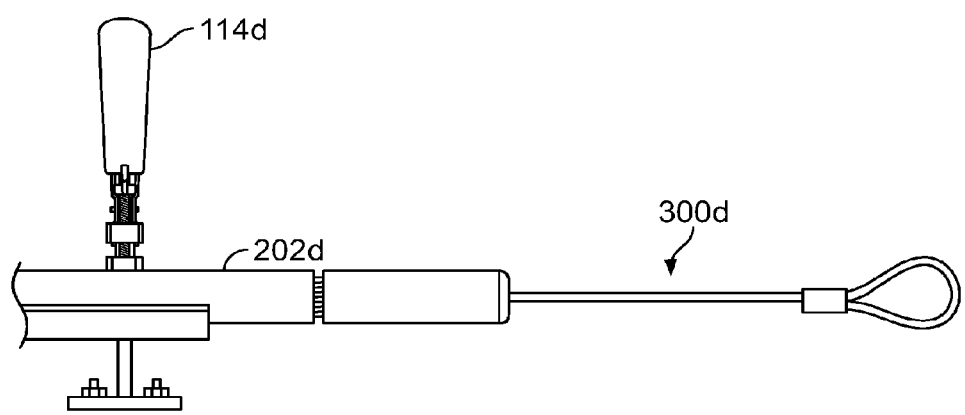
Figure 19A:
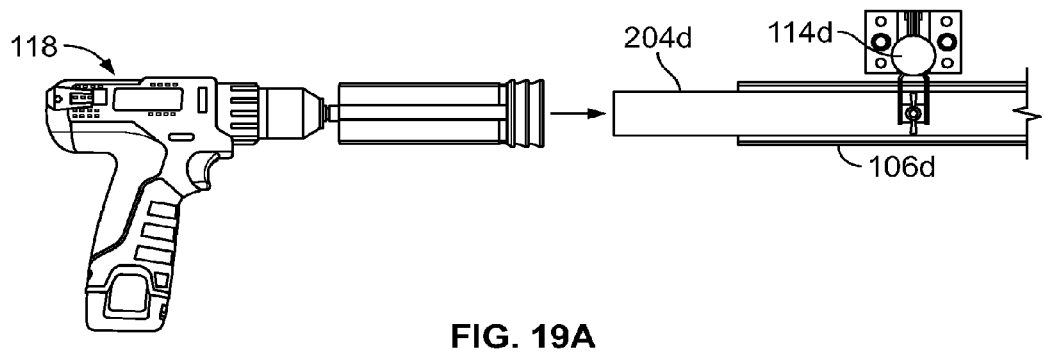
FIGS. 19A-19C are side elevational views of the stripper of FIG. 2 being used to strip an end portion of a cable.
Figure 19B:
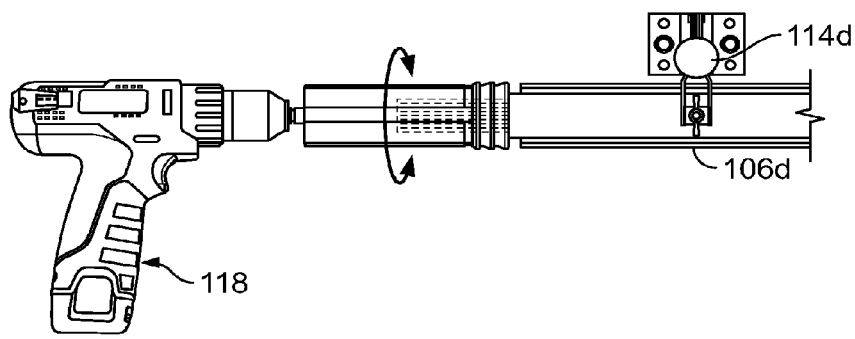
Figure 19C:
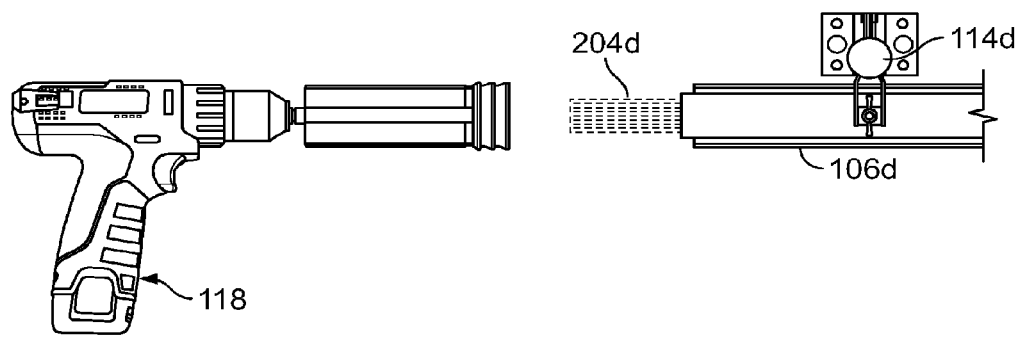

FIGS. 17-19 illustrate removing at least one cable layer from cable 202d, such as the cable jacket and/or insulation, from an end portion 204d of cut cable 202d with a stripper 118, and placing a pulling lug 300d onto the stripped end 204d of cable 202d. A similar procedure is followed for cables 202a-202c (of FIG. 17).

Figure 22:
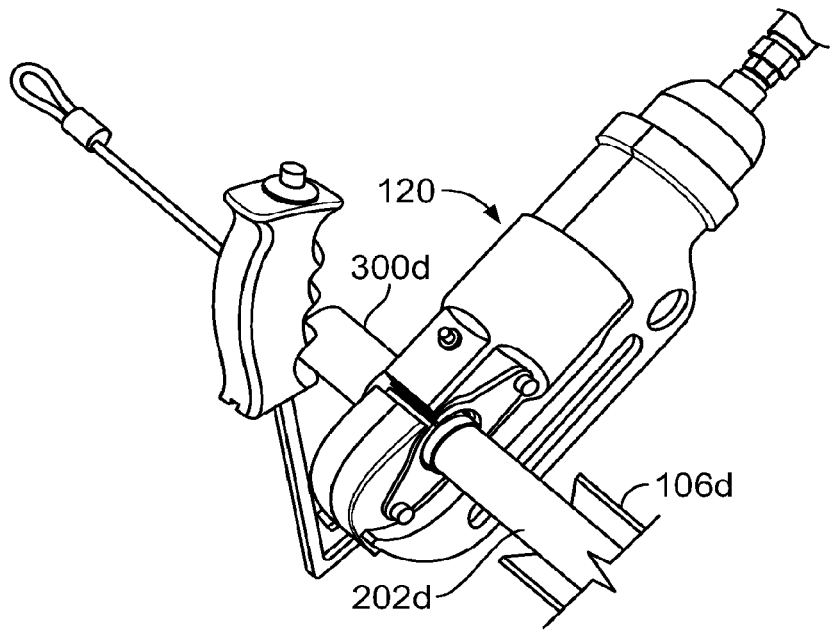
FIG. 22 is a perspective view of the crimper of FIGS. 20 and 21 crimping the pulling lug onto the cable.
Figure 23:
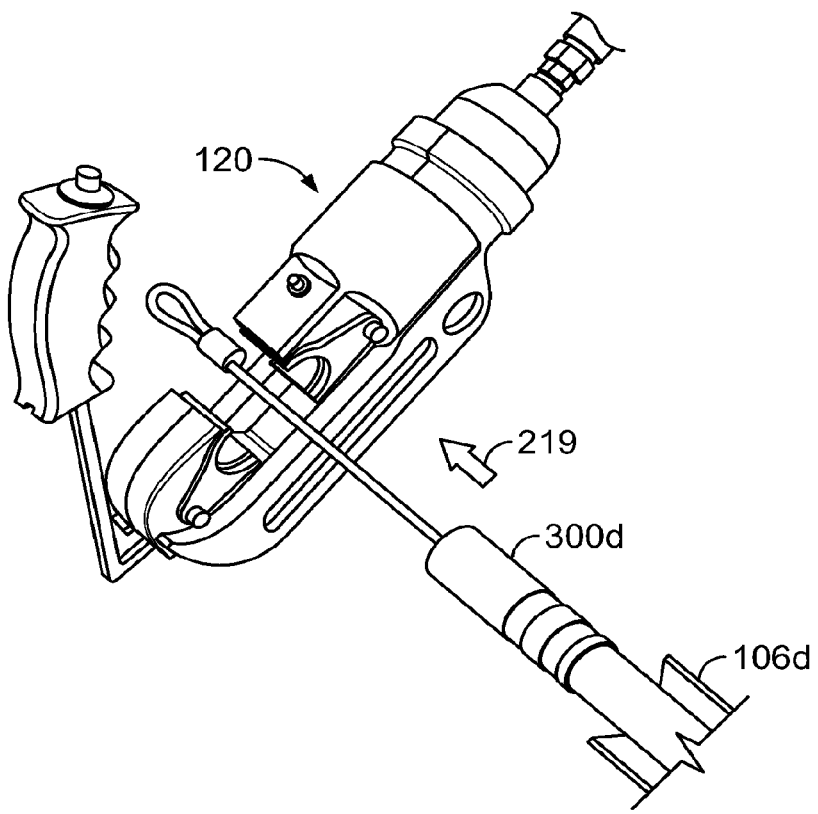
FIG. 23 is a perspective view of the crimper of FIGS. 20-22 being removed from the cable.
Figure 24:
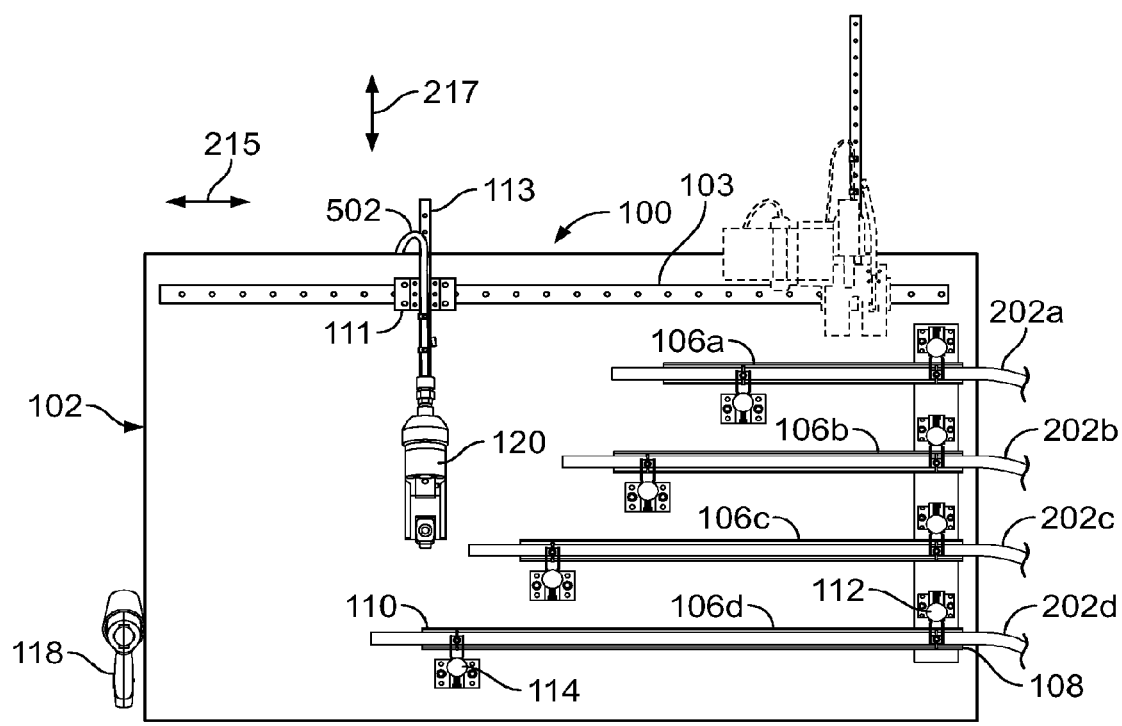
FIG. 24 is a top plan view of the pulling head work station of FIG. 1 with the chop saw in a retracted position and the crimper in use.
Figure 25:
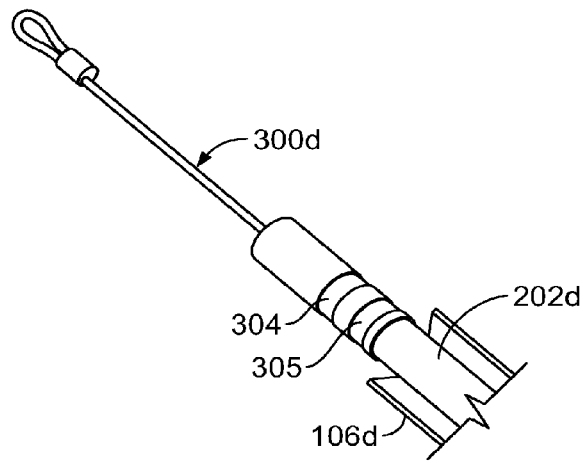
FIG. 25 is a perspective view of a pulling lug crimped onto a cable after use of the present technology.

FIGS. 20-25 illustrate crimping a pulling lug 300d onto the end portion of cut and stripped cable 202d using the crimping head 120. As illustrated in FIG. 24, the crimping head 120 can be positioned with respect to cable 202d via a track 103 and a carriage 111 to cut the cable. The carriage 111 of FIG. 24 slides along the track 103 in the direction of arrows 215. Furthermore, the crimping head 120 is mounted at one end of slide bar 113. The slide bar 113 slides with respect to the carriage 111 in the directions indicated by arrows 217 of FIG. 24.

Figure 20:
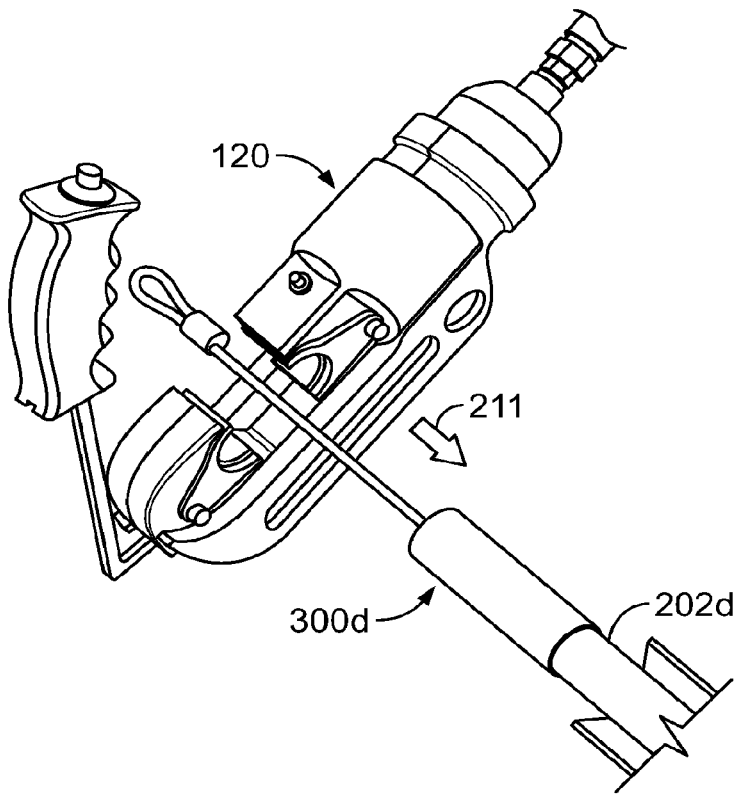
FIG. 20 is a perspective view of the crimper of FIG. 3 being positioned with respect to a pulling lug on a cable.
Figure 21:
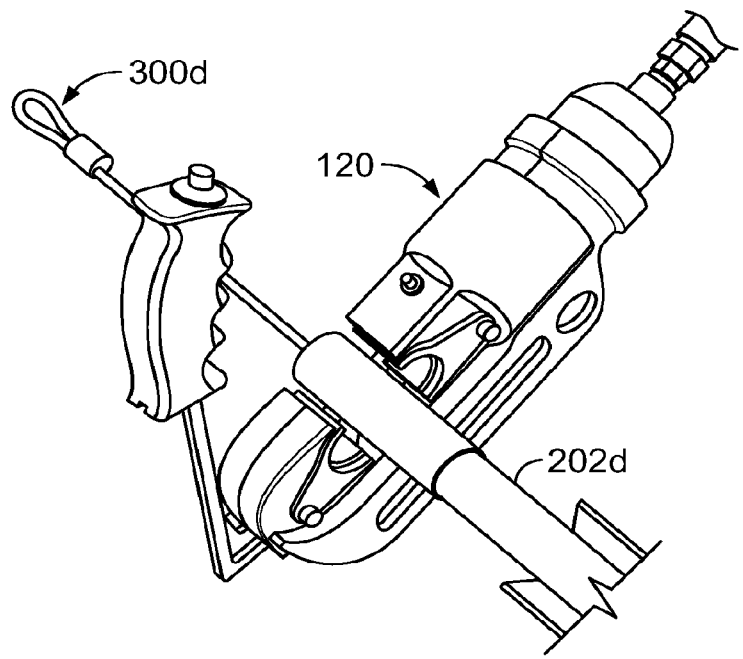
FIG. 21 is a perspective view of the crimper of FIG. 20 in place with respect to the pulling lug on a cable.

As a result, as shown in FIGS. 20-21, the crimping head 120 can be slidably positioned, in the direction of arrow 211 in FIG. 20, over a pulling lug 300*d* that has been placed over the stripped end portion of cable 202*d*. As shown in FIG. 22, the crimping head then is activated to crimp the pulling lug 300*d* onto the stripped end portion of cable 202*d*, preferably in two locations, such as first crimping location 304 and second crimping location 305 illustrated in FIG. 25. As shown in FIG. 23, the crimping head can be slidably removed in the direction of the arrow 219 after the crimping process. A similar procedure is followed for cables 202*a*-202*c* and pulling lugs 300*a*-300*c* (of FIGS. 24 and 26).

Figure 26:
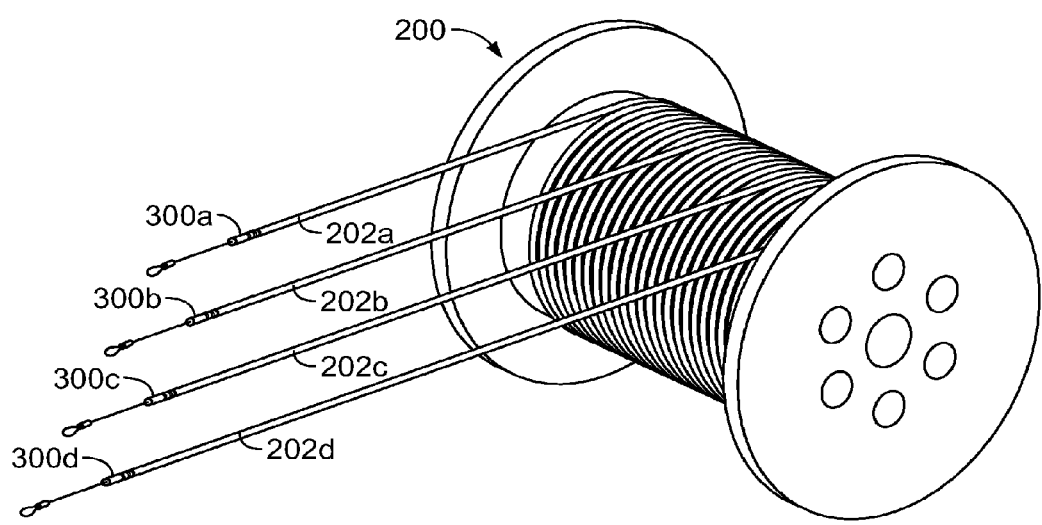
FIG. 26 is a perspective view of a reel with cables having pulling lugs attached thereto after use of after use of the present technology.

FIG. 26 illustrates a reel 200 having a plurality of cables 202*a*-202*d* after the pulling lugs 300*a*-300*d* have been attached in accordance with the above.

While the preferred embodiments of the invention have been shown and described, it will be apparent to those skilled in the art that changes and modifications may be made therein without departing from the spirit of the invention, the scope of which is defined by the appended claims.

What is claimed is:

1. A pulling head work station comprising:
   a base having a work surface;
   a first cable clamp mounted to the work surface and adapted to receive a cable;
   a second cable clamp mounted to the work surface at a position spaced from the first cable clamp and adapted to receive the cable; and
   a saw movably mounted on the work station so that the saw may be positioned to cut the cable at a location adjacent to the second cable clamp,
   wherein the second cable clamp is spaced from the first cable clamp in a length direction of the cable.

2. The pulling head work station of claim 1 further comprising a crimping head movably mounted to the base so that a pulling lug may be crimped on the cut end of the cable.

3. The pulling head work station of claim 1 further comprising a plurality of second cable clamps, said plurality of second cable clamps featuring a staggered configuration.

4. The pulling head work station of claim 3 further comprising a wire stripper removably mounted to the base.

5. A pulling head work station comprising:
   a base having a work surface;
   a first cable clamp mounted to the work surface and adapted to receive a cable;
   a second cable clamp mounted to the work surface at a position spaced from the first cable clamp and adapted to receive the cable; and
   a saw movably mounted on the work station so that the saw may be positioned to cut the cable at a location adjacent to the second cable clamp,
   wherein the second cable clamp includes a plurality of second cable clamps; said plurality of second cable clamps featuring a staggered configuration.

6. The pulling head work station of claim 5 further comprising a wire stripper removably mounted to the base.

* * * * *